United States Patent
Yanagisawa et al.

[11] Patent Number: 6,124,988
[45] Date of Patent: Sep. 26, 2000

[54] OBJECTIVE LENS

[75] Inventors: Takuma Yanagisawa; Katsuhiro Koike; Masakazu Ogasawara, all of Saitama, Japan

[73] Assignee: Pioneer Electronic Corporation, Tokyo, Japan

[21] Appl. No.: 09/096,536

[22] Filed: Jun. 12, 1998

[30] Foreign Application Priority Data

Jun. 13, 1997 [JP] Japan ................................. 9-157233

[51] Int. Cl.[7] .......................... G02B 13/18; G02B 3/10; G11B 7/00
[52] U.S. Cl. ...................... 359/719; 359/721; 369/44.23; 369/112
[58] Field of Search ..................... 359/719, 708, 359/718, 721, 741; 369/44.14, 44.23, 112

[56] References Cited

U.S. PATENT DOCUMENTS

| | | |
|---|---|---|
| 5,703,862 | 12/1997 | Lee et al. ................. 369/112 |
| 5,777,803 | 7/1998 | Ju et al. .................. 359/719 |
| 5,835,283 | 11/1998 | Yamanaka ................ 359/719 |
| 5,889,748 | 3/1999 | Shimano et al. ........ 369/112 |

*Primary Examiner*—Scott J. Sugarman
*Assistant Examiner*—Jordan M. Schwartz
*Attorney, Agent, or Firm*—Morgan, Lewis & Bockius LLP

[57] ABSTRACT

An objective lens that allows spherical aberration to be suppressed during the reproduction of a CD without sacrificing reproduction characteristics of a DVD, has a first numerical aperture comprising a refracting surface that is in rotatory symmetry about an optical axis. A part of the refracting surface is displaced along the optical axis as an annular concave (or convex) portion centered on the optical axis. The annular concave (or convex) portion has a certain inner diameter $r_1$ and a certain outer diameter $r_2$ that reduce RMS aberration V to a value close to a minimum value. The annular portion has a certain depth (or height).

17 Claims, 4 Drawing Sheets

OBJECTIVE LENS

BACKGROUND OF THE INVENTION

This application claims the benefit of Japanese Patent Application No. 9-157233 filed on Jun. 13, 1997, which is hereby incorporated by reference.

1. Field of the Invention

The present invention relates to an objective lens used in an optical system of an optical pick-up in a compatible optical reproducing apparatus for reading information from several types of optical discs.

2. Description of the Related Art

Optical reproducing apparatus include optical disc players for reading information recorded on optical discs such as a laser disc (LD), a compact disc (CD) and a digital video disc (DVD), which are optical recording media. There are also compatible disc players for reading information from more than one type of optical disc. An optical pick-up in such a compatible disc player includes an optical system for irradiating light beams onto an optical disc and for reading beams returned by the optical disc. Optical discs as optical information recording media are designed with different specifications of numerical aperture NA, substrate thickness, optimum optical wavelength for reading, and the like. In order to provide an optical pick-up for a player which is compatible with LDs, CDs and DVDs, it is necessary to compensate for different numerical apertures NA and substrate thicknesses. The numerical apertures of a CD and a DVD are 0.45 and 0.6, respectively, and the substrate thicknesses of a CD and a DVD are 1.2 mm and 0.6 mm, respectively.

When attempting to reproduce a CD using an objective lens for a DVD, the difference in the substrate thickness results in spherical aberration. Such aberration can be compensated by using a hologram bifocal objective lens or by switching two objective lenses having different focal lengths for reading a DVD and a CD. However, a hologram bifocal objective lens is difficult to manufacture and suffers from loss of light. An optical lens switching system for switching two objective lenses increases the size of the pick-up itself and is therefore more expensive.

It is difficult to read a CD using only an objective lens intended for a DVD because beams for reading a CD, which pass through a peripheral region of the objective lens for reading a DVD, cannot be collected due to the aberration effect. Under such circumstances, objective lenses have been developed in which an annular cutout mask is formed from the center thereof to mask beams at an intermediate region between the central and peripheral regions of the lens. Beams passing near the outermost region of the objective lens do not impinge upon an optical detector under a significant effect of aberration and hence do not act as noises in the reproduction signal. Beams passing through the central region of the lens are less subjected to the effect of aberration. However, even such systems utilizing a cutout mask cannot prevent the occurrence of spherical aberration attributable to the difference in the thicknesses of a DVD and a CD.

In summary, when attempting to reproduce a CD using an objective lens for a DVD, spherical aberration occurs due to the difference between the thicknesses of those discs (0.6 mm). Reproduction characteristics tend to become worse according to the degree of spherical aberration.

SUMMARY OF THE INVENTION

Accordingly, the present invention is directed to an improved objective lens that substantially obviates one or more of the problems due to limitations and disadvantages of the related art.

An object of the present invention is to provide an objective lens that is formed with a certain annular portion to make it possible to suppress spherical aberration during the reproduction of a CD without sacrificing reproduction characteristics of a DVD.

According to one aspect of the present invention, there is provided an objective lens with a first numerical aperture, comprising a refracting surface that is in rotatory symmetry about an optical axis, wherein a part of the refracting surface is displaced along the optical axis as an annular concave portion centered on the optical axis and wherein the annular concave portion has values $r_1$ and $r_2$ which reduce RMS aberration V to a value close to a minimum value.

According to another aspect of the present invention, there is provided an objective lens with a first numerical aperture comprising a refracting surface which is in rotatory symmetry about an optical axis, wherein a part of the refracting surface is displaced along the optical axis as an annular convex portion centered on the optical axis and wherein the annular convex portion has values $r_1$ and $r_2$ which reduces RMS aberration V to a value close to a minimum value.

According to the present invention, it is possible to obtain an objective lens that is formed with an annular concave (or convex) portion to allow spherical aberration to be suppressed during the reproduction of a CD without sacrificing reproduction characteristics of a DVD, although it has a basic configuration of an objective lens for DVDs.

This objective lens is also advantageous in cost, pick-up size and ease of manufacture.

DETAILED DESCRIPTION OF THE PREFERRED EMBODIMENTS

Hereinafter, an embodiment of the present invention will be described with reference to the accompanying drawings.

Figure 1A:
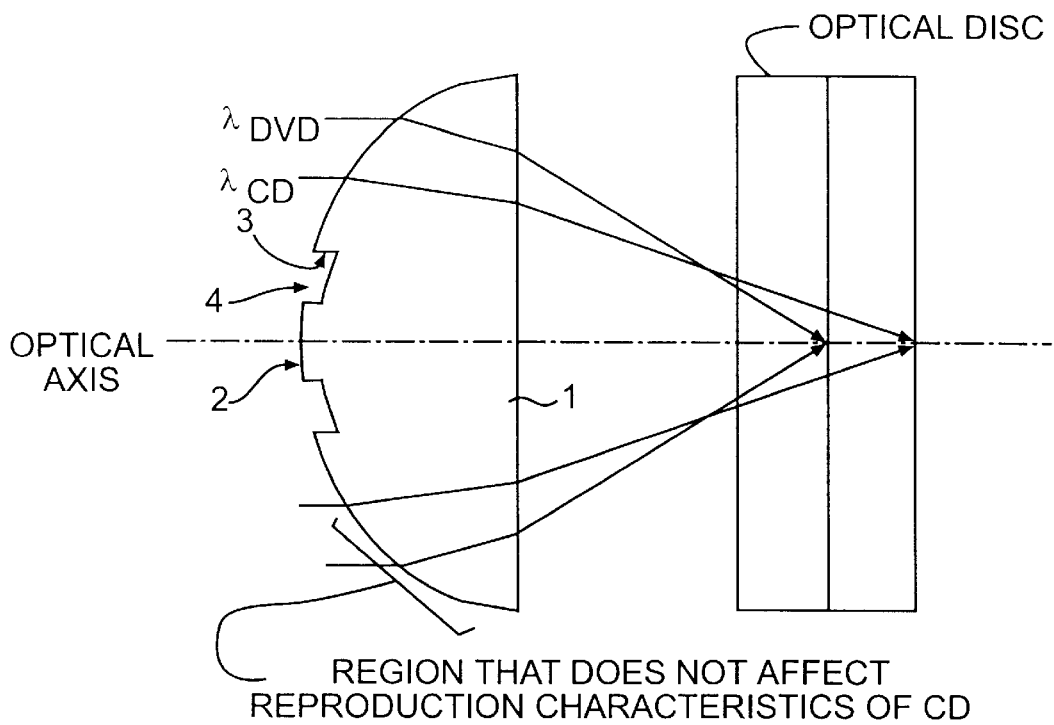
FIGS. 1A and 1B are schematic sectional views of objective lenses according to a first embodiment and a second embodiment of the present invention, respectively.
Figure 1B:
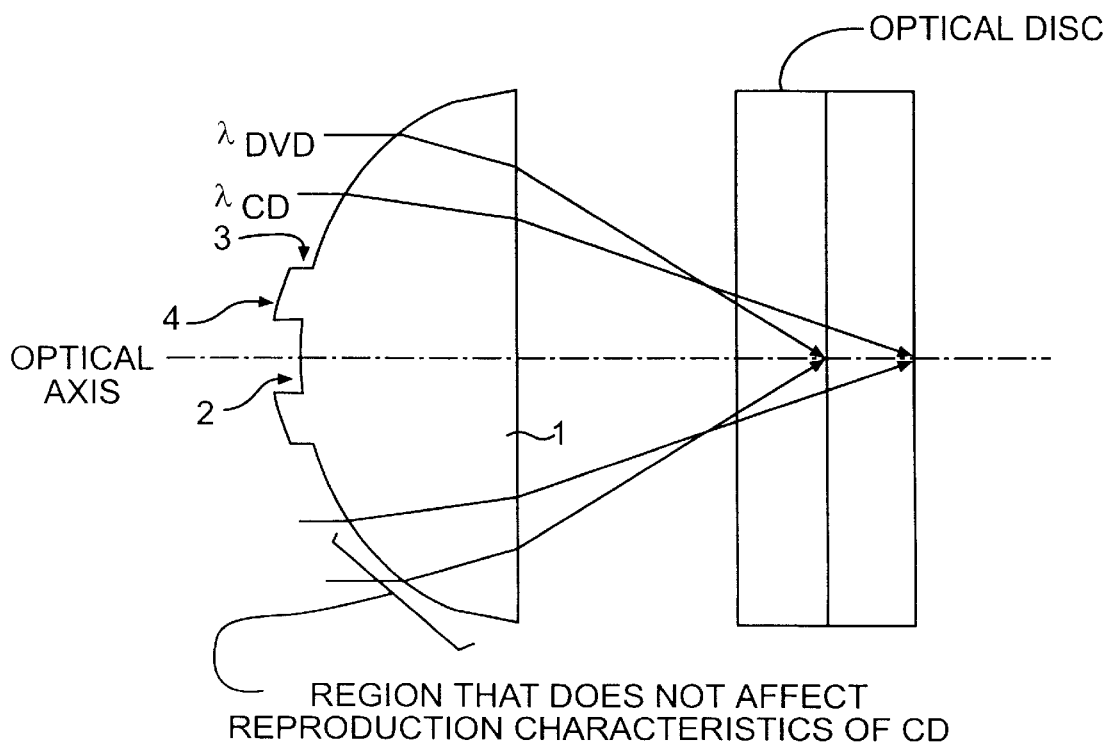

FIGS. 1A and 1B show objective lenses according to the present invention. An objective lens 1 of a first embodiment shown in FIG. 1A is a condensing convex lens including a refracting surface 2 for DVDs which is in rotatory symmetry about the optical axis. The objective lens 1 further includes an annular concave portion 3 centered on the optical axis on the refracting surface. A bottom portion 4 of the annular concave portion defines a refracting surface that is a surface parallel-displaced from the above-described refracting surface 2, e.g., a refracting surface having the same radius of curvature as that of the refracting surface 2. An objective lens 1 of a second embodiment shown in FIG. 1B is a condensing convex lens including a refracting surface 2 that is in rotatory symmetry about the optical axis and an annular convex portion 3 centered on the optical axis on the refracting surface. An upper surface 4 of the annular convex portion has a surface that is parallel-displaced from the refracting surface 2. When the refracting surface 2 is designed as a non-spherical surface to be used as an objective lens for DVDs, the bottom portion (or upper surface) 4 is a similar non-spherical surface that is parallel-displaced therefrom. The annular concave (or convex) portion 3 has a depth (or a height) Δh. The present embodiment is intended for compatible reproduction by two types of wavelengths.

Namely, laser beams having a wavelength $\lambda_{DVD}$=650 nm are used for reproducing a DVD and laser beams having a wavelength $\lambda_{CD}$=780 nm are used for reproducing a CD. The annular concave (or convex) portion 3 can be uniformly formed using etching or the like and, alternatively, the convex portion and the concave surrounding portion can be uniformly formed on the surface of a lens body made of glass by means of thin film transfer such as 2P.

Figure 2:
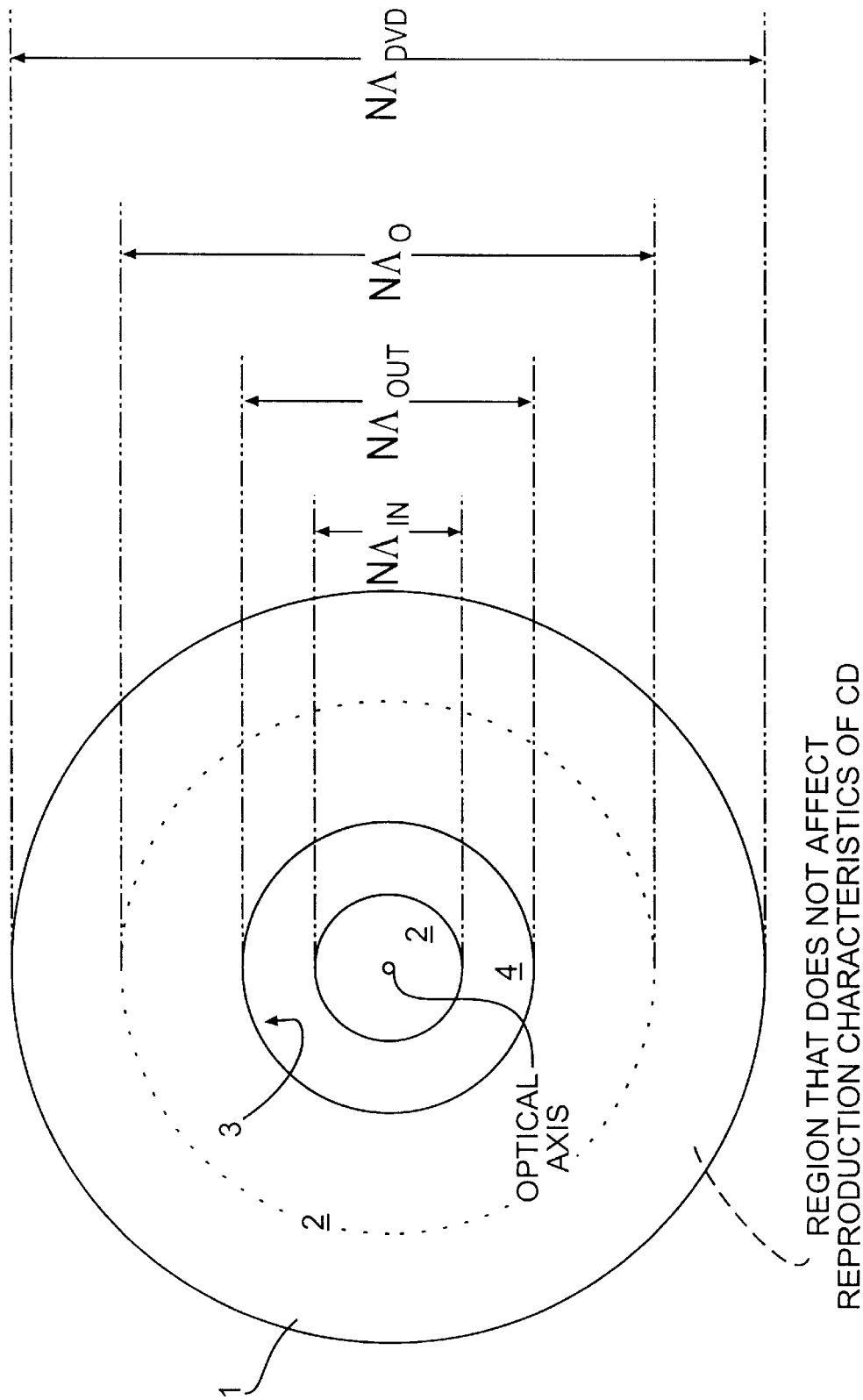
FIG. 2 is a schematic front view of the objective lens according to an embodiment of the present invention.

As shown in FIG. 2, the objective lens 1 of the embodiment includes the refracting surface 2 which has the diameter of a region corresponding to a numerical aperture $NA_{DVD}$=0.6 as a whole at the wavelength for DVD $\lambda_{DVD}$=650 nm. In FIG. 2, the diameter of each region is indicated as a numerical aperture. Specifically, $NA_o$ represents the diameter of a region corresponding to an effective numerical aperture which affects the reproduction characteristics of a CD; $NA_{out}$ represents the diameter of a circular region formed by an outer edge of the annular concave (or convex) portion; and $NA_{in}$ represents the diameter of a circular region formed by an inner edge of the annular concave (or convex) portion. Therefore, an inner radius $r_1$ (not shown) of the annular concave (or convex) portion from the optical axis to an inner step portion and an outer radius $r_2$ (not shown) from the optical axis to an outer step portion are expressed by ratios $NA_{in}/NA_o$ and $NA_{out/NAo}$, respectively.

In general, when a CD is reproduced using an objective lens for a DVD, beams passing outer portions of the objective lens have less influence on reproduction characteristics because they are significantly defocused. Therefore, the inner diameter $NA_{in}$, outer diameter $NA_{out}$ and depth (or height) Δh of the annular concave or convex portion have been analytically determined such that the amount of RMS aberration in the region affecting the reproduction characteristics of a CD (NA≦=$NA_o$=0.45) is reduced. For simplicity, the following analysis will proceed using an optical-path length difference Δ1 (Δ1=Δh/(n−1) where n is the refractive index of the material of the objective lens) attributable to the depth (or height) Δh as a parameter.

When there is spherical aberration, aberration W(r) at the best image point can be generally calculated as follows using a Czernike aberration polynomial:

$$W(r) = A_{63}(20r^6 - 30r^4 + 12r^2 - 1) + A_{42}(6r^4 - 6r^2 + 1) + A_{21}(2r^2 - 1)$$

where r represents a radius of the lens from the optical axis; $A_{63}$, $A_{42}$ and $A_{21}$ represent a fifth order spherical aberration coefficient, a third order spherical aberration coefficient and a defocus aberration coefficient, respectively.

Let us assume that $r_1$ (=$NA_{in}/NA_o$) represents the inner radius of the concave or convex annular portion; $r_2$ (=$NA_{out}/NA_o$) represents the outer radius; and Δ1(λ) represents the optical-path length difference resulting from the concave or convex portion. Then, RMS aberration V is obtained by the following equation:

$$V(r_1, r_2, A_{21}, \Delta l, C) = \sqrt{\frac{\int_0^1 \int_0^{2\pi} (W(r) + \Delta l + C)^2 r\, dr\, d\theta}{\pi}}$$

$$= \sqrt{2\int_0^1 (W(r) + \Delta l + C)^2 r\, dr}$$

$$= \sqrt{2\int_0^1 (W(r) + C)^2 r\, dr + 2\int_{r1}^{r2}(2\Delta l(W(r) + C) + \Delta l^2) r\, dr}$$

where C represents a wavefront offset. Specifically, a minimum value having five parameters ($r_1$, $r_2$, $A_{21}$, Δ1, C) must be found. However, by adding conditions that $dV/d(A_{21})$=0; $dV/d(\Delta1)$=0; and dV/dC=0, V ($r_1$, $r_2$, $A_{21}$, Δ1, C) can be reduced to two variables $r_1$ and $r_2$ to allow two-dimensional optimization.

Figure 3:
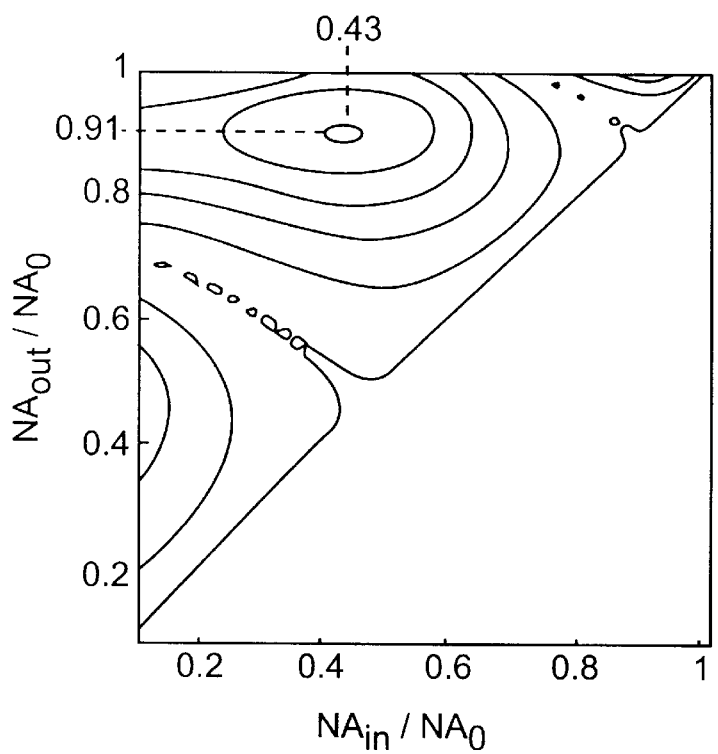
FIG. 3 is a graph illustrating the amount of aberration relative to the annular concave or an inner radius $r_1$ ($=NA_{in}/NA_o$) and an outer radius $r_2$ ($=NA_{out}/NA_o$) of the objective lens according to an embodiment of the present invention.

Change in the amount of aberration (rms) is calculated for reproduction of a CD using the objective lens for DVDs ($\lambda_{CD}$=780 nm) The calculated density of the RMS aberration V relative to $r_1$ $_{(=NAin/}NA_o)$ and $r_2$ (=$NA_{out}/NA_o$) can be displayed as shown in FIG. 3. The depth indicated by the depth contour lines in FIG. 3 represents the RMS aberration (in the direction normal to the plane of the drawing). it is apparent from FIG. 3 that the inner radius $r_1$ (=$NA_{in}/NA_o$) is preferably in a range from 0.27 to 0.55 with an optimum value of 0.43 and that the outer radius $r_2$ (=$NA_{out}/NA_o$) is preferably in a range from 0.85 to 0.96 with an optimum value of 0.91. $NA_o$ represents an effective numerical aperture that affects the reproduction characteristics of a CD.

RMS aberration for Δ1 is calculated with the optimum inner radius $r_1$ (=$NA_{in}/NA_o$) of 0.43 and the optimum outer radius $r_2$ (=$NA_{out}/NA_o$) of 0.91.

The optical-path length difference Δ1(λ) attributable to the concave (or convex) portion that minimizes the RMS aberration is obtained from the following equation where the inner radius and outer radius of tie concave or convex annular portion are represented by $r_1$ (=$NA_{in}/NA_o$) and $r_2$ (=$NA_{out}/NA_o$), respectively:

$$\Delta 1 = [A_{42}\{1 + 2r_1^4 - 3r_2^2 + 2r_2^4 + r_1^2(-3 + 2r_2^2)\} +$$

$$A_{63}\{-1 + 5r_1^6 + 6r_2^2 - 10r_2^4 + 5r_2^6 + r_1^4(-10 + 5r_2^2) +$$

$$r_1^2(6 - 10r_2^2 + 5r_2^4)\}] / \{-1 - 3r_1^4 + 4r_2^2 - 6r_2^4 + 3r_2^6 +$$

$$r_1^4(6 - 3r_2^2) + r_1^2(-4 + 3r_2^4)\}.$$

When $r_1=0.43$ and $r_2=0.91$ are substituted in the above equation, the optical-path length difference $\Delta 1_{best}$ attributable to the concave (or convex) portion that minimizes the RMS aberration can be expressed as follows:

$$\Delta 1_{best} = 0.8216 A_{42} + 0.01697 A_{63}$$

where $A_{42}$ and $A_{63}$ represents a third order spherical aberration coefficient and a fifth order spherical aberration coefficient, respectively.

Figure 4:
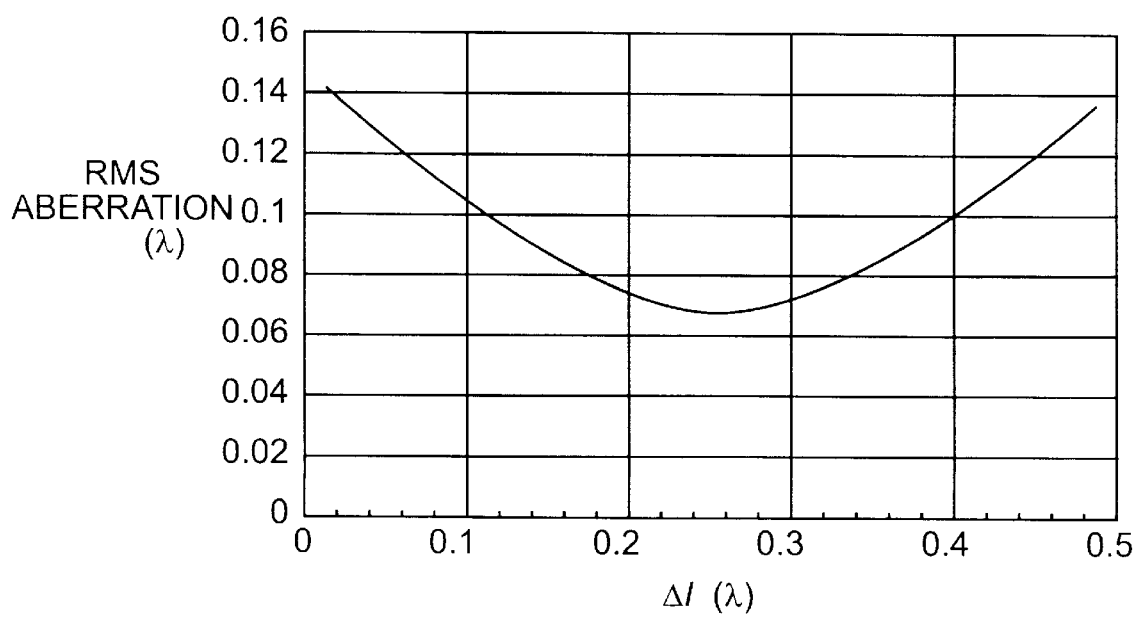
FIG. 4 is a graph showing RMS aberration relative to the optical-path length difference $\Delta 1$ at the annular concave or convex portion of the objective lens according to an embodiment of the present invention.

As shown in FIG. 4, by setting $\Delta 1_{best}$ at approximately $0.26 \mu$ (=$0.20 \mu$m), an amount of aberration of $0.142 \lambda$ (rms), in a case that no annular portion is provided ($\Delta 1=0.0$), can be reduced to $0.068 \lambda$ (rms), where $\lambda = \lambda_{CD} = 780$ nm.

The height of the annular portion may be $\Delta 1_{best} + n\lambda$ when the nature of the beams is taken into consideration (when n is an integer). By utilizing this, the reproduction characteristics of a CD can be improved with substantially no deterioration of the reproduction characteristics of a DVD.

Figure 5:
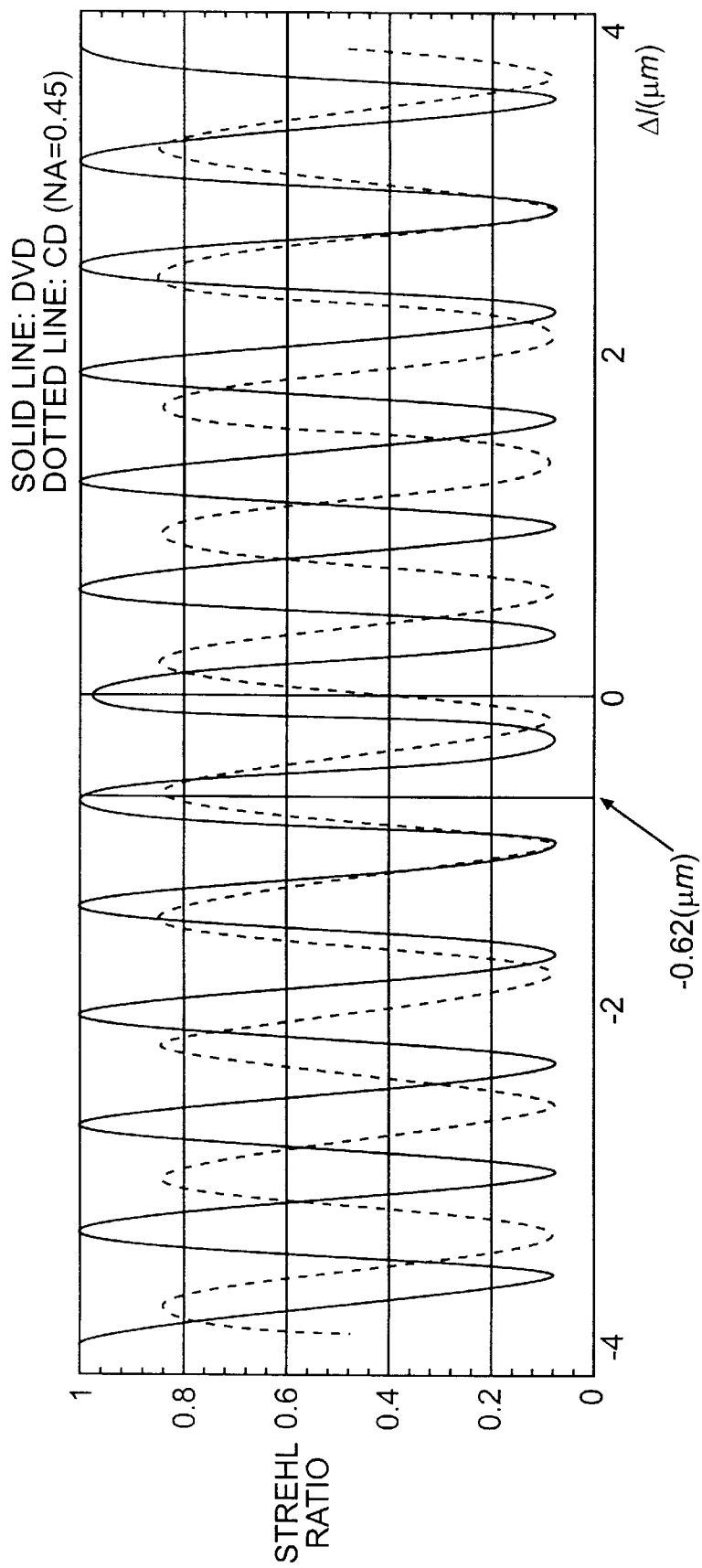
FIG. 5 is a graph showing a Strehl ratio relative to the optical-path length difference $\Delta 1$ at the annular concave or convex portion of the objective lens according to an embodiment of the present invention.

The Strehl ratios of the DVD and CD are then compared to find a setting that is preferable for both discs. When the optical-path length difference attributable to the annular portion is varied, several points where peaks of the Strehl ratios of the DVD and CD substantially coincide are found, as shown in FIG. 5. A Strehl ratio is an index used for evaluation of the quality of a spot formed by an optical system that is at a maximum value of 1 when the optical system has no aberration and is decreased as the aberration increases. Since the design is basically intended for DVDs, the curve for a DVD has peaks that repeat at every wavelength $\lambda_{DVD}=650$ nm starting from a certain peak, even if there is an annular portion. The curve for a CD has lower peaks shifted therefrom that repeat at every wavelength $\lambda_{CD}=780$ nm.

In order to obtain preferable reproduction characteristics, the Strehl ratios must be equal to or higher than 0.8.

As is apparent from FIG. 5, those curves have peaks that are close to each other, for example, when the optical-path length difference is $-0.62$ $\mu$m. By calculating the amount of aberration at each of the discs at this value, it was revealed that the aberration at the DVD was sufficiently suppressed and the aberration at the CD also was suppressed to the Marechal limit (0.07 $\mu$) or less, as shown in Table 1 below.

TABLE 1

|  | DVD | CD |
|---|---|---|
| Strehl Ratio | 0.9839 | 0.8335 |
| OPD (RMS) | 0.020$\lambda$ | 0.065$\lambda$ |
| Numerical Aperature | 0.6 | 0.45 |

As is apparent from FIG. 5, in order to obtain the optical-path length difference $\Delta 1$ at the annular portion that provides preferable Strehl ratios for both of the DVD and CD on an analytical basis, the Strehl ratios must be equal to or greater than 0.8. Therefore, a half-width value, i.e., 0.15 $\lambda_{DVD}$ that provides the Strehl ratio 0.8 or more for each of the peaks of the DVD curve in FIG. 5 and the $\Delta 1_{best}$ obtained above are used to obtain integers $N_1$ and $N_2$ that satisfy:

$$|N_1 \lambda_{DVD} - (N_2 \lambda_{CD} + \Delta 1_{best})| < 0.15 \lambda_{DVD}$$

where $\lambda DVD = 650$ nm and $\lambda_{DVD} = 780$ nm such the absolute value $|N_1 \lambda_{DVD} - (N_2 \lambda_{CD} + \Delta 1_{best})|$ on the left side of the inequality is reduced to a very small value or substantially zero. Based ot the resultant integers $N_1$ and $N_2$, $\Delta_1$ is averaged using an equation:

$$\Delta l = \frac{N_1 \lambda_{DVD}}{2} + \frac{N_2 \lambda_{CD} + \Delta l_{best}}{2}$$

($\Delta 1_{best}$ is the value that minimizes the aberration at the CD) to obtain $\Delta 1$ that is a compromise acceptable for both of the DVD and CD. The average may be weighted depending on the conditions.

In summary, based on the integers $N_1$ and $N_2$, the depth (or height) $\Delta h$ of the annular concave (or convex) portion is set between values:

$$\frac{N_1 \lambda_{DVD}}{n-1} \text{ and } \frac{N_2 \lambda_{CD} + \Delta l_{best}}{n-1}$$

It then is possible to provide an objective lens that is formed with an annular concave (or convex) portion to suppress spherical aberration during the reproduction of a CD without sacrificing reproduction characteristics of a DVD, while maintaining a basic configuration of an objective lens for DVDs.

The features and advantages of the invention are apparent from the description and thus is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An objective lens with a first numerical aperture, comprising:

a refracting surface that is in rotatory symmetry about an optical axis, wherein a part of the refracting surface is displaced along the optical axis as an annular concave portion centered on the optical axis, and wherein the annular concave portion has values $r_1$ and $r_2$ that reduce RMS aberration V when $VdV/d(A_{21})=0$; $dV/d(\Delta 1)=0$; and $dV/dC=0$, the RMS aberration V satisfying:

$$V(r_1, r_2, A_{21}, \Delta l, C) =$$

$$\sqrt{2 \int_0^1 (W(r) + C)^2 r \, dr + 2 \int_{r_1}^{r_2} (2\Delta l (W(r) + C) + \Delta l^2) r \, dr}$$

$$W(r) = A_{63}(20r^6 - 30r^4 + 12r^2 - 1) + A_{42}(6r^4 - 6r^2 + 1) + A_{21}(2r^2 - 1),$$

and wherein r represents a radius from the optical axis, $A_{63}$ represents a fifth order spherical aberration coefficient, $A_{42}$ represents a third order spherical aberration coefficient, $A_{21}$ represents a defocus aberration coefficient, C represents a wavefront offset, $\Delta 1$ represents $\Delta h/(n-1)$, $\Delta h$ represents a depth of the annular concave portion, n represents a refractive index of the objective lens, $r_1$ represents $NA_{in}/NA_o$, $r_2$ represents $NA_{out}/NA_o$, $NA_o$ represents a diameter of a region having a second numerical aperture corresponding to an effective numerical aperture smaller than the first numerical aperture, $NA_{in}$ represents a diameter of a region formed by an inner edge of the annular portion centered on the optical axis, and $NA_{out}$ represents a diameter of a region formed by an outer edge of the annular portion centered on the optical axis.

2. The objective lens according to claim 1, wherein $r_1$ is within a range of 0.27 to 0.55 and $r_2$ is within a range of 0.85 to 0.96.

3. The objective lens according to claim 1, wherein $\Delta h$ is set at a value between $$\frac{N_1 \lambda_{DVD}}{n-1} \text{ and } \frac{N_2 \lambda_{CD} + \Delta l_{best}}{n-1}$$

wherein n represents the refractive index of the objective lens that is obtained based on integers $N_1$ and $N_2$ selected according to an absolute value defined by $|N_1\lambda_{DVD}-(N_2\lambda_{CD}+\Delta 1_{best})|$, $\lambda_{DVD}$ represents a first wavelength and $\lambda_{CD}$ represents a second wavelength longer than the first wavelength, and wherein $\Delta 1_{best}$ represents $\Delta 1$ obtained from $$\Delta 1 = [A_{42}\{1 + 2r_1^4 - 3r_2^2 + 2r_2^4 + r_1^2(-3 + 2r_2^2)\} +$$
$$A_{63}\{-1 + 5r_1^6 + 6r_2^2 - 10r_2^4 + 5r_2^6 + r_1^4(-10 + 5r_2^2) +$$
$$r_1^2(6 - 10r_2^2 + 5r_2^4)\}]/\{-1 - 3r_1^6 + 4r_2^2 - 6r_2^4 + 3r_2^6 +$$
$$r_1^4(6 - 3r_2^2) + r_1^2(-4 + 3r_2^4)\}.$$

4. The objective lens according to claim 3, wherein the absolute value $|N_1\lambda_{DVD}-N_2\lambda_{CD}+\Delta 1_{best}|$ is equal to or smaller than $0.15\ \lambda_{DVD}$.

5. The objective lens according to claim 1, wherein the first numerical aperture is for a first type of disc and the second numerical aperture is for a second type of disc.

6. The objective lens according to claim 3, wherein the integers $N_1$ and $N_2$ are selected so as to minimize the absolute value $|N_1\lambda_{DVD}-(N_2\lambda_{CD}+\Delta 1_{best})|$.

7. An objective lens with a first numerical aperture, comprising:

a refracting surface that is in rotatory symmetry about an optical axis, wherein a part of the refracting surface is displaced along the optical axis as an annular convex portion centered on the optical axis and wherein the annular convex portion has values $r_1$ and $r_2$ that reduce RMS aberration V when $VdV/d(A_{21})=0$, $dV/d(\Delta 1)=0$, and $dV/dC=0$, the RMS aberration V satisfying:

$$V(r_1, r_2, A_{21}, \Delta l, C) =$$
$$\sqrt{2\int_0^1 (W(r) + C)^2 r\,dr + 2\int_{r1}^{r2}(2\Delta l(W(r) + C) + \Delta l^2)r\,dr}$$

$$W(r) = A_{63}(20r^6 - 30r^4 + 12r^2 - 1) + A_{42}(6r^4 - 6r^2 + 1) + A_{21}(2r^2 - 1),$$

wherein r represents a radius from the optical axis, $A_{63}$ represents a fifth order spherical aberration coefficient, $A_{42}$ represents a third order spherical aberration coefficient, $A_{21}$ represents a defocus aberration coefficient, C represents a wavefront offset, $\Delta 1$ represents $\Delta h/(n-1)$, $\Delta h$ represents a height of the annular convex portion, n represents a refractive index of the objective lens, $r_1$ represents $NA_{in}/NA_o$, $r_2$ represents $NA_{out}/NA_o$, $NA_o$ represents a diameter of a region having a second numerical aperture corresponding to an effective numerical aperture smaller than the first numerical aperture, $NA_{in}$ represents a diameter of a region formed by an inner edge of the annular portion centered on the optical axis, and $NA_{out}$ represents a diameter of a region formed by an outer edge of the annular portion centered on the optical axis.

8. The objective lens according to claim 7, wherein $r_1$ is within a range of 0.27 to 0.55 and $r_2$ is within a range of 0.85 to 0.96.

9. The objective lens according to claim 7, wherein $\Delta h$ is set at a value between $$\frac{N_1 \lambda_{DVD}}{n-1} \text{ and } \frac{N_2 \lambda_{CD} + \Delta l_{best}}{n-1}$$

wherein n represents the refractive index of the objective lens that is obtained based on integers $N_1$ and $N_2$ select according to an absolute value defined by $|N_1\lambda_{DVD}-(N_2\lambda_{CD}+\Delta 1_{best})|$, $\lambda_{DVD}$ represents a first wavelength and $\lambda_{CD}$ represents a second wavelength longer than the first wavelength, and wherein $\Delta 1_{best}$ represents $\Delta 1$ obtained from $$\Delta 1 = [A_{42}\{1 + 2r_1^4 - 3r_2^2 + 2r_2^4 + r_1^2(-3 + 2r_2^2)\} +$$
$$A_{63}\{-1 + 5r_1^6 + 6r_2^2 - 10r_2^4 + 5r_2^6 + r_1^4(-10 + 5r_2^2) +$$
$$r_1^2(6 - 10r_2^2 + 5r_2^4)\}]/\{-1 - 3r_1^6 + 4r_2^2 - 6r_2^4 + 3r_2^6 +$$
$$r_1^4(6 - 3r_2^2) + r_1^2(-4 + 3r_2^4)\}.$$

10. The objective lens according to claim 9, wherein the absolute value $|N_1\lambda_{DVD}-(N_2\lambda_{CD}+\Delta 1_{best})|$ is equal to or smaller than $0.15\ \lambda_{DVD}$.

11. The objective lens according to claim 7 wherein the first numerical aperture is for a first type of disc and the second numerical aperture is for a second type of disc.

12. The objective lens according to claim 9, wherein the integers $N_1$ and $N_2$ are selected so as to minimize the absolute value $|N_1\lambda_{DVD}-(N_2\lambda_{CD}+\Delta 1_{best})|$.

13. An objective lens with a first numerical aperture, comprising:

a first refracting surface that is in rotatory symmetry about an optical axis, and a second refracting surface in rotatory symmetry about the optical axis and parallel-displaced from the first refracting surface along the optical axis as an annular portion centered on the optical axis, wherein the annular portion has values $r_2$ and $r_2$ that reduce RMS aberration, $r_1$ represents $NA_{in}/NA_o$, $r_2$ represents $NA_{out}/NA_o$, $NA_o$ represents a diameter of a region having a second numerical aperture corresponding to an effective numerical aperture smaller than the first numerical aperture, $NA_{in}$ represents a diameter of a region formed by an inner edge of the annular portion centered on the optical axis, and $NA_{out}$ represents a diameter of a region formed by an outer edge of the annular portion centered on the optical axis.

14. The objective lens according to claim 13, wherein the annular portion of the refracting surface is concave.

15. The objective lens according to claim 13, wherein the annular portion of the refracting surface is convex.

16. The objective lens according to claim 13, wherein $r_1$ is within a range from 0.27 to 0.55 and $r_2$ is within a range from 0.85 to 0.96.

17. The objective lens according to claim 13, wherein the first numerical aperture is for a first type of disc and the second numerical aperture is for a second type of disc.

* * * * *

UNITED STATES PATENT AND TRADEMARK OFFICE
CERTIFICATE OF CORRECTION

PATENT NO.     : 6,124,988
DATED          : September 26, 2000
INVENTOR(S)    : Yanagisawa et al.

It is certified that error appears in the above-identified patent and that said Letters Patent is hereby corrected as shown below:

<u>Column 7,</u>
Line 46, change "$A_{21}(2r^2 - 1),$" to -- $A_{21}(2r^2 - 1)$, and --.

<u>Column 8,</u>
Line 12, change "select" to -- selected --;
Line 43, change "$r_2$" first occurrence to -- $r_1$ --.

Signed and Sealed this

Sixteenth Day of October, 2001

*Attest:*

*Attesting Officer*

NICHOLAS P. GODICI
*Acting Director of the United States Patent and Trademark Office*